May 6, 1958 W. E. HEDLUND ET AL 2,833,152
CHAIN
Filed April 17, 1956
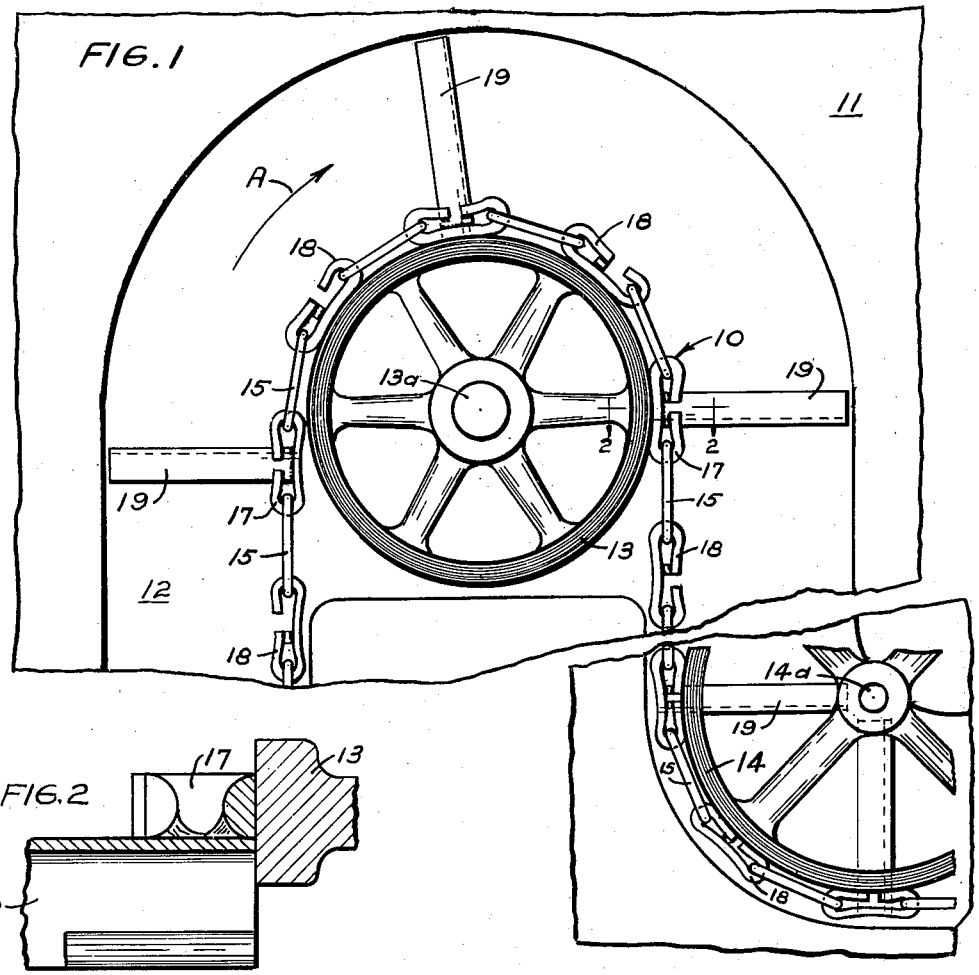
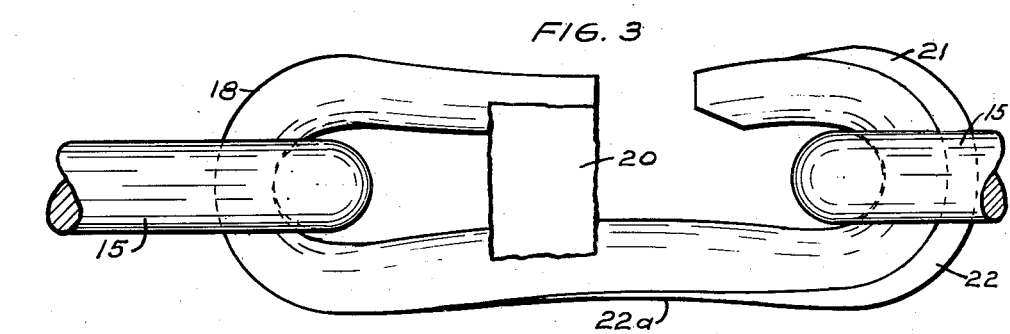
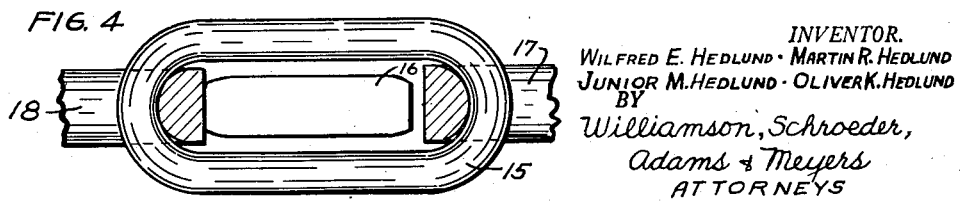
INVENTOR.
WILFRED E. HEDLUND · MARTIN R. HEDLUND
JUNIOR M. HEDLUND · OLIVER K. HEDLUND
BY
Williamson, Schroeder,
Adams & Meyers
ATTORNEYS

United States Patent Office 2,833,152
Patented May 6, 1958

2,833,152

CHAIN

Wilfred E. Hedlund, Martin R. Hedlund, Junior M. Hedlund, and Oliver K. Hedlund, Boyceville, Wis.; said Junior M. Hedlund and said Oliver K. Hedlund assignors to said Wilfred E. Hedlund and said Martin R. Hedlund, doing business as Hedlund Manufacturing Company, Boyceville, Wis.

Application April 17, 1956, Serial No. 578,793

2 Claims. (Cl. 74—245)

This invention relates to chains and more particularly relates to chains of the type employed in barn-cleaning apparatus and the like.

In many barn-cleaning devices, a single chain is used to draw the conveyor flights through the gutter of the barn. Of course, it is necessary to keep the flights in a substantially horizontal position and in engagement with the bottom of the gutter. Some difficulty has been experienced in maintaining the conveyor flights in this position, particularly when the flights and the chain are being drawn around a turn or corner in the gutter. In the past sprocket wheels which mesh with the chain links, have been used at the turns or corners in the gutter for guiding the chain therearound and maintaining the chain in proper orientation so that the conveyor flights will remain in engagement with the bottom of the gutter. Experience has shown that after several months of use, a chain will stretch so that the links thereof will no longer positively mesh with the teeth of the sprocket wheel and when this condition exists, the chain is likely to slip off the sprocket wheel and the condition must be repaired by either replacing one or more sections of the chain or replacing the sprocket wheel with another sprocket wheel having differently spaced teeth. Obviously, either of these means of repairing a conventional barn-cleaning device is expensive and time-consuming. It should further be noted that most barn-cleaning devices include mechanism for taking up the slack in the chain due to the stretching thereof. Of course such mechanisms only have a limited capacity so that after the chain has stretched a certain amount, the take-up mechanism can no longer take up the additional slack in the chain due to further stretching.

With these comments in mind, it is to the elimination of these and other disadvantages that the present invention is directed, along with the inclusion therein of other novel and desirable features.

An object of the invention is to provide a new and improved chain of simple and inexpensive construction and operation which may be readily and easily properly oriented for maintaining conveyor flights or the like secured thereto in proper position.

Another object of the invention is the provision of a novel chain which is adapted to be driven by a sprocket wheel and which may be guided around turns in different directions in a gutter or the like with cylindrically surfaced rotary guides and be held in proper orientation thereby to maintain conveyor flights or the like on the chain in engagement with the bottom of the gutter.

Still another object of the invention is to provide an improved chain which is well adapted to be guided around turns in different directions and in proper orientation by cylindrically surfaced rotary guides and which may be readily and easily adjusted in length to compensate for longitudinal stretching.

These and other objects and advantages of our invention will more fully appear from the following description made in connection with the accompanying drawings wherein like reference characters refer to similar parts throughout the several views and in which:

Fig. 1 is a plan view, with portions broken away, of the chain comprising the present invention applied to a barn-cleaning device;

Fig. 2 is a detail vertical section view taken along a line as indicated at 2—2 in Fig. 1;

Fig. 3 is an enlarged detail plan view of one of the links of the chain shown in Fig. 1; and Fig. 4 is a detail elevation view of a portion of the chain shown in Fig. 1 and showing the manner in which the chain will mesh with and be driven by a sprocket wheel.

One form of the invention is shown in the accompanying drawings and is described herein.

The chain which comprises the present invention and indicated in general by numeral 10 is utilized in the present embodiment in a barn-cleaning mechanism and in Fig. 1 a barn floor 11 is shown having a gutter 12. A pair of cylindrically surfaced rotary guides 13 and 14 are shown in the drawings for guiding the chain 10 and are disposed on vertical axes and are disposed with respect to each other and with respect to the chains so that as the chain is moved in the direction of arrow A the rotary guides 13 and 14 will successively turn the chain around corners in the gutter 12 in different directions. The rotary guides 13 and 14 are suitably journalled in the bottom of gutter 12 on rotary shafts 13a and 14a.

The chain comprising the present invention is provided with a plurality of generally oblong shaped loop links 15 which in the disclosed form, are disposed in vertical planes. The loop links 15 are spaced from each other at regular intervals and are adapted, as best seen in Fig. 4, to receive the drive teeth 16 of a chain-driving sprocket wheel.

The loop links 15 are interconnected with guide links which are constructed to maintain the chain in proper orientation as the same is guided around and by the cylindrically surfaced rotary guides 13 and 14. The guide links, which are disposed generally in horizontal planes, take two different forms, one form comprising flight-supporting guide links 17 and the other form comprising detached or hook links 18. The flight-supporting links 17 and the detachable links 18 are quite similar in construction with certain exceptions which will be specifically pointed out. The links 17 and 18 are constructed of lengths of rigid half round stock such as steel with the ends thereof bent back upon themselves into spaced and substantially end-to-end relation with respect to each other. The curvature of the bends is similar to the cross sectional peripheral contour of the loop links 15. As best seen in Figs. 2 and 4, the rounded surface of the half round stock is disposed to the interior of the bends in the links and the flat surface of the half round stock is positioned to the exterior of the bend and disposed in a plane which is substantially normal to the plane in which the link lies. The vertically flat external side surface of the links 17 and 18 are concavely curved as best seen in Fig. 3 to substantially conform to the peripheral surface configuration of the rotary guides 13 and 14. It should be noted that both sides of the link has concavely curved exterior surfaces to facilitate the guiding of the chain in either direction around the rotary guides 13 and 14 and maintaining the chain in proper orientation. The spaced ends of the flight-supporting links 17 are both affixed as by welding, as best seen in Fig. 2, to the outwardly extending conveyor flights 19, which in the form shown comprise angle irons and which are to be maintained in engagement with the bottom of the gutter 12. One of the ends of each of the detachable links 18 is affixed to the opposite side or intermediate portion thereof by means of a rigid metal interconnection 20 welded across the link. The other open hook end 21 of each of the detachable links 18 is provided with a rigid reinforcing backing lamination 22 applied to the exterior surface of the link. The lamination may be built up on the hook end 21 by welding and the welding lamination 22 will taper to decreased thickness at 22a along the transverse side of the link to provide a surface to fit the peripheral surface contour of the rotary guide 13.

In operation, the chain will be sprocket driven by teeth projecting through the loop links and bearing against the exterior ends of the alternate guide links, as best seen in Fig. 4. Of course slack will be taken up in the barn cleaner by suitable mechanism which is not shown and is not particularly important to the present invention with the exception that it should be recognized that such mechanisms for taking up slack in a barn have definite capacities. As the chain is drawn in the direction of arrow A it will be seen that it is turned by the rotary guides first to the right and then to the left. The vertically flat and concavely curved exterior surfaces of the guide links 17 and 18 will engage the peripheral cylindrical surface of the rotary guides 13 and 14 and provide a very substantial surface engagement therewith for positively positioning the flights 19 in engagement with the bottom of the gutter 12 and preventing the flights 19 from swinging upwardly and over the material which they are to move along. It will be seen that as the guide links 17 and 18 successively engage the rotary guides for being turned in different directions, first one side of the guide links will engage the rotary guide 13 and then the other side of the guide links will engage the rotary guide 14.

It will be realized that while under load, there is a very substantial tension exerted through the chain 10 and the welded lamination 22 restricts any tendency of the open hook end 21 of the detachable links 18 from being deformed. The detachable links will thereby maintain their desired characteristic shape with the arcuately curved concave exterior surfaces at the opposite sides for providing substantial surface area engagement with the rotary guides.

It should also be noted that the inner rounded surfaces of the guide links 17 and 18 have a configuration or surface contour which is substantially identical to the peripheral contour of the ends of loop links 15. A close-fitting bearing connection is thereby provided between each of the guide links 17 and 18 and the adjacent loop links 15 and a substantial surface area engagement is provided between these links to restrict wearing at the points of engagement due to high pressures which are exerted by the tension on the chain.

It will be noted that substantial twisting forces are exerted by the flights 19 on the flight-supporting links 17 and in order to restrict deformation of the links 17 both of the ends of the links must be affixed to the flights. The proper orientation of the guide links 17 and flights 19 is enhanced by the provision of the guiding detachable links 18 disposed alternately between the flights 19 and the links 17. Furthermore, the present arrangement provides the added advantage that the chain may be driven by a sprocket, the teeth 16 of which may be inserted into regularly spaced loop lengths, and the present chain has the further advantage that sections of the chain may be removed by detaching a pair of the hook ends of detaching links 18 from adjacent loop links 15 and thereby provide for maintaining the length of the chain within the capacity of the mechanism for taking up slack. As the chain stretches after a period of use, it may be necessary to replace the drive sprocket in order that the teeth will mesh with the loop links 15, but it should be noted that none of the rotary guides such as 13 and 14 need be changed because the guide links 17 and 18 will continue to fit the peripheral surface contour of the cylindrically surfaced rotary guides.

It will, of course, be understood that various changes may be made in the form, details, arrangement and proportions of the parts without departing from the scope of my invention which consists of the matter shown and described herein and set forth in the appended claims.

What is claimed is:

1. A link for a link chain, comprising a length of rigid half round stock having a rounded surface and having a flat surface, said half round stock having an intermediate portion and having opposite ends bent back upon themselves into spaced end-to-end relation with respect to each other for removably receiving an adjacent link of the chain therebetween, one of said ends being rigidly affixed to said intermediate portion and the other of said ends forming an open hook, said rounded surface being disposed to the interior of the link and on the inside of the bend to provide a bearing connection and substantial surface area engagement with an adjacent link, and said flat surface being disposed on the exterior of the link and in a position normal to the plane of the link and a reinforcing lamination welded to the flat exterior surface of said open hook end whereby to restrict deformation of the link.

2. A link for a link chain, comprising a length of rigid stock having a flat side surface, said stock having an intermediate portion and having opposite ends bent back upon themselves into spaced end-to-end relation with each other for removably receiving an adjacent link of the chain therebetween, one of said ends being rigidly affixed to said intermediate portion and the other of said ends forming an open hook and said flat surface being disposed on the exterior of the link and in a position normal to the plane of the link, and a reinforcing lamination welded to the flat exterior surface of said open hook end whereby to restrict deformation of the link.

References Cited in the file of this patent

UNITED STATES PATENTS

| | | |
|---|---|---|
| 231,186 | Neacy | Aug. 17, 1880 |
| 377,484 | Gandy | Feb. 7, 1888 |
| 452,122 | Kotter | May 12, 1891 |
| 1,529,243 | Drake et al. | Mar. 10, 1925 |
| 1,635,085 | Johnson | July 5, 1927 |
| 1,720,166 | Chavand | July 9, 1929 |
| 2,320,834 | Schroeder | June 1, 1943 |
| 2,554,589 | Patz et al. | May 29, 1951 |